United States Patent [19]
Parsons et al.

[11] 3,963,616
[45] June 15, 1976

[54] SEALING ARRANGEMENT FOR HYPERFILTRATION

[75] Inventors: Gary L. Parsons, Gastonia; James Keith Turner, Lincolnton, both of N.C.

[73] Assignee: Gaston County Dyeing Machine Company, Mount Holly, N.C.

[22] Filed: July 26, 1974

[21] Appl. No.: 492,267

[52] U.S. Cl. ............................ 210/232; 210/321 R; 210/433 M
[51] Int. Cl.² ........................................ B01D 31/00
[58] Field of Search ............ 210/232, 321, 433, 450

[56] References Cited
UNITED STATES PATENTS

| | | |
|---|---|---|
| 3,542,204 | 11/1970 | Clark .................... 210/450 X |
| 3,616,929 | 11/1971 | Manjikian .................... 210/433 X |
| 3,700,110 | 10/1972 | Engalitcheff, Jr. ............... 210/450 X |
| 3,846,307 | 11/1974 | Petrucci et al. .................. 210/450 X |

*Primary Examiner*—Frank A. Spear, Jr.
*Attorney, Agent, or Firm*—Richards, Shefte & Pinckney

[57] ABSTRACT

An improved arrangement is provided by which semi-permeable tube elements of a hyperfiltration module may be sealed effectively in the module assembly while protecting them against destructive stressing.

4 Claims, 7 Drawing Figures

SEALING ARRANGEMENT FOR HYPERFILTRATION

CROSS-REFERENCES TO RELATED APPLICATIONS

Copending application Ser. No. 492,173 filed July 26, 1974, discloses a treating system employing the improved sealing arrangement of the present invention.

BACKGROUND OF THE INVENTION

Hyperfiltration modules commonly employ a bundle of elongate, porous tubes lined with semipermeable membranes and fixed in sealed relation within a chamber so that liquid to be filtered is directed in parallel therethrough. A module of this sort in which carbon tube supported semipermeable membranes are used is described in the March 1974 issue of Product Engineering at page 13.

The treating system disclosed in the above-noted copending application preferably includes hyperfiltration units incorporating carbon tube modules of the foregoing sort in which somewhat more than 900 of the carbon tube elements are assembled in each module, and the sealing arrangement of the present invention was developed for assembling the considerable bundle of tube elements in the modules effectively while protecting the relatively fragile carbon tubes from undue stressing.

SUMMARY OF THE INVENTION

According to the present invention sealing of the carbon tube elements is effected adjacent each end thereof by resilient O-ring members disposed around each tube end portion and subjected to enough compression for effective external sealing of the tube elements in a manner that limits the possible compression sufficiently to avoid destructive stressing of these elements in providing the O-ring seal thereat, as described in further detail below.

DETAILED DESCRIPTION OF THE INVENTION

Figure 1:
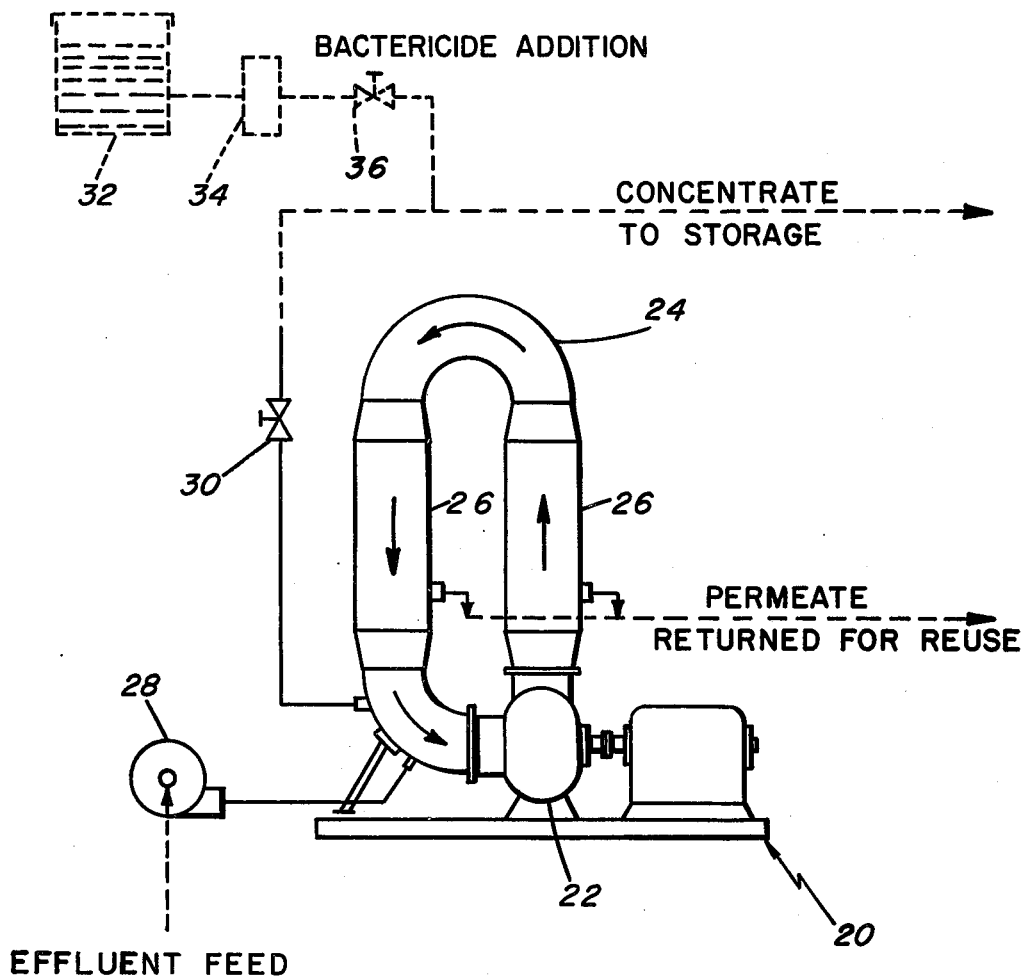
FIG. 1 is a schematic illustration of a representative hyperfiltration unit suitable for use in the treating system of the above-noted copending application.

A representative arrangement for a hyperfiltration unit 20 suited for use in the treating system of the previously noted copending application is diagramed in FIG. 1 as comprising a main circulation pump 22 piped for recirculation of effluent in a loop 24 containing two hyperfiltration modules 26 such as are detailed further in FIGS. 2–7 and will be additionally described below in connection with those drawing figures. Effluent is delivered to the hyperfiltration unit 20 by an injection pump 28 connected with loop 24 in series with the main circulating pump 22 ahead of the filtration surfaces. Recirculating flow is maintained in loop 24 at a rate of about 2,000 gallons per minute resulting in a flow velocity of about 15 feet per second along the filtration surfaces.

Permeate consisting of the filtered effluent portion that passes through the filtration surfaces leaves the modules 26 continually and is returned for reuse, as indicated in FIG. 1, while the circulating effluent portion remaining in loop 24 at a proportionately increasing concentration of solute, disperse phase, or the like, is taken off under the control of a valve 30 when its concentration has reached a suitable level or the level corresponding to the optimum capability of the hyperfiltration unit 20, the control valve 30 being employed to regulate the take off rate so that the concentration is maintained at this level. Upon leaving the hyperfiltration unit 20, a bactericide may be added to the recovered concentrate in metered quantities, as from a supply tank at 32 through a flow meter 34 under the control of a valve 36, so that bacteriological activities, and particularly odor, are effectively dealt with.

FIGS. 2–7 of the drawings detail the particulars of a structural arrangement suitable for the hyperfiltration modules 26 used in the FIG. 1 treating unit and illustrate an improved sealing arrangement for such modules embodying the present invention. As shown, the modules 26 incorporate a bundle of elongate, porous carbon tubes 52 lined with semipermeable membranes of the sort noted earlier. This tube bundle is fixed in sealed relation within a chamber formed in principal part by a cylindrical housing 54 so that liquid to be filtered is directed in parallel through the tubes of the bundle. The improved tube sealing arrangement comprises closure members 56 fixed, as by welding, adjacent each end of housing 54 and having a pattern of apertures 58 formed therein for respective slip fit disposition of end portions of each tube 52 therethrough. At the outer face of each closure member 56 a resilient O-ring 60 is disposed around each tube 52, and a face flange 62 having a corresponding pattern of apertures 64 formed therein for receiving the tube end portions is bolted in place over the O-rings 60 by means of studs 66 at which spacer elements or washers 68 are interposed (as seen best in FIG. 4) in a thickness proportioned to limit compression of O-rings 60 by the bolted face flanges 62 sufficiently to prevent destructive stressing of the tube end portions while allowing enough O-ring compression for effective external sealing of tubes 52 at the closure members 56.

Figure 5:
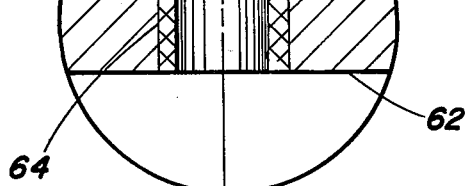
FIG. 5 is an enlarged sectional detail taken at the 5—5 circle in FIG. 2.
Figure 6:
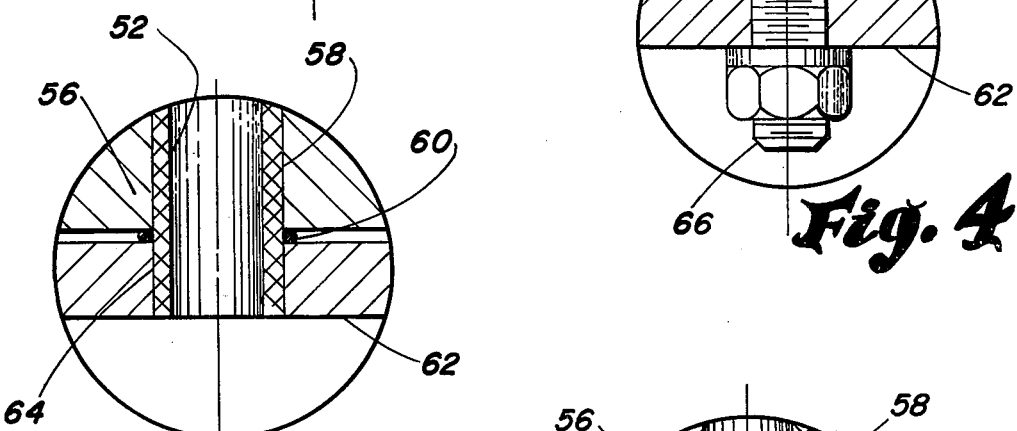
FIG. 6 is a corresponding section showing a modified arrangement of the FIG. 5 detail.
Figure 7:
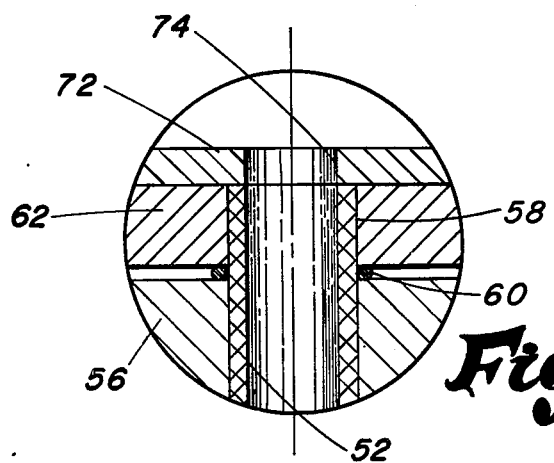
FIG. 7 is an enlarged sectional detail taken at the 7—7 circle in FIG. 2.

The apertures 64 in face flanges 62 may be formed like those in closure members 56 for slip fit reception of the tube end portions as illustrated in FIG. 5, or these apertures may be enlarged in relation to those in the closure members 56, as at 64' in FIG. 6, in which case a washer 70 is additionally disposed around each tube end portion over the O-ring sealing members 60 for compressing the same when the face flanges 62 are bolted in place. Provision of enlarged face flange apertures 64' as in the FIG. 6 arrangement provides the advantage of facilitating assembly of the face flanges 62 by rendering close alignment with the closure member apertures 58 and axial trueness of the tubes 52 less critical, but involves the disadvantage of requiring that a considerable number of the additional washers 70 be handled along with the O-rings 60. No matter which of the FIG. 5 or FIG. 6 face flange arrangements is used, an end plate 72 is additionally bolted along with the face flange 62 to the closure member 56 at the outlet end of the module 26, and this end plate 72 also has a corresponding pattern of apertures 74 formed therein that are of sufficiently smaller diameter than that of the hyperfiltration tubes 52 to maintain these tubes 52 in place against endwise thrust in the outlet direction without obstructing flow therethrough (see FIG. 7). As a matter of inactive assembly the tubes 52 are held in place adequately by the O-ring sealing members 60, but static pressure differential across the module 26 and dynamic pressure at the inlet side which develop during operation exert enough endwise thrust at tubes 52 to require opposing support by the illustrated end plate arrangement. Comparable opposing support may be provided, alternatively, by employing a face flange 62 formed intergrally with the equivalent of end flange 72 and suitably boring and counterboring the same to allow tube end reception and resist endwise thrust.

Figure 2:
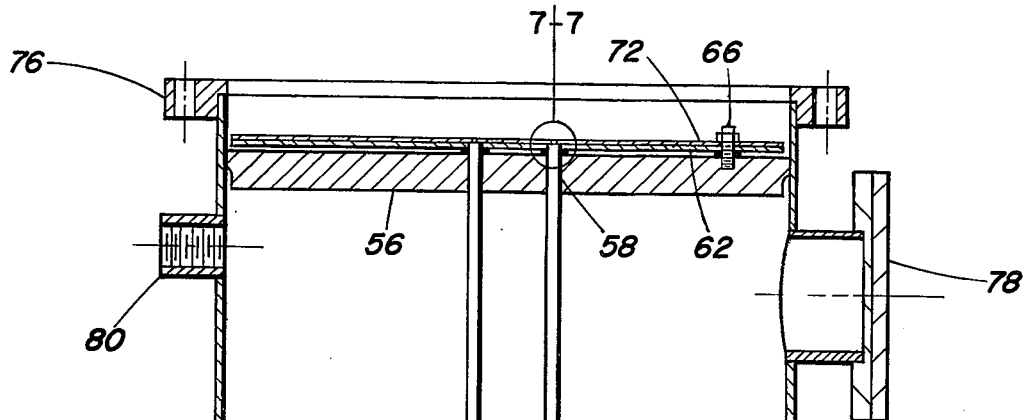
FIG. 2 is a central longitudinal section of a representative hyperfiltration module for use in the FIG. 1 unit.
Figure 2:
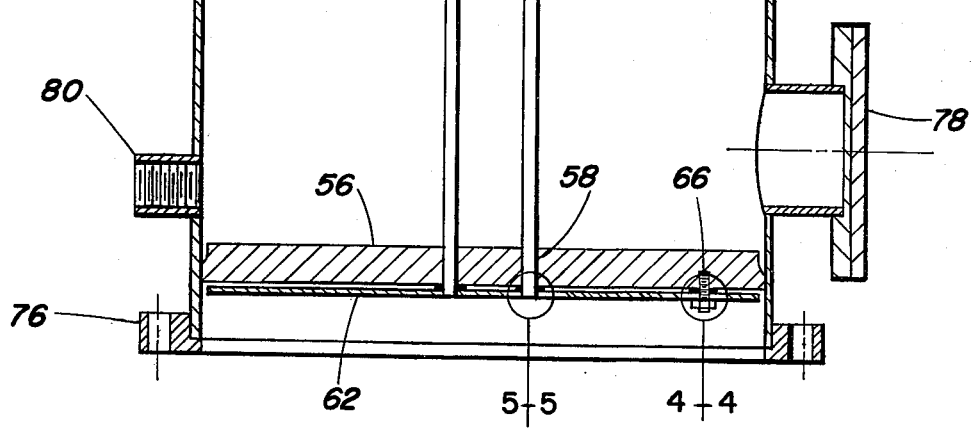
Figure 3:
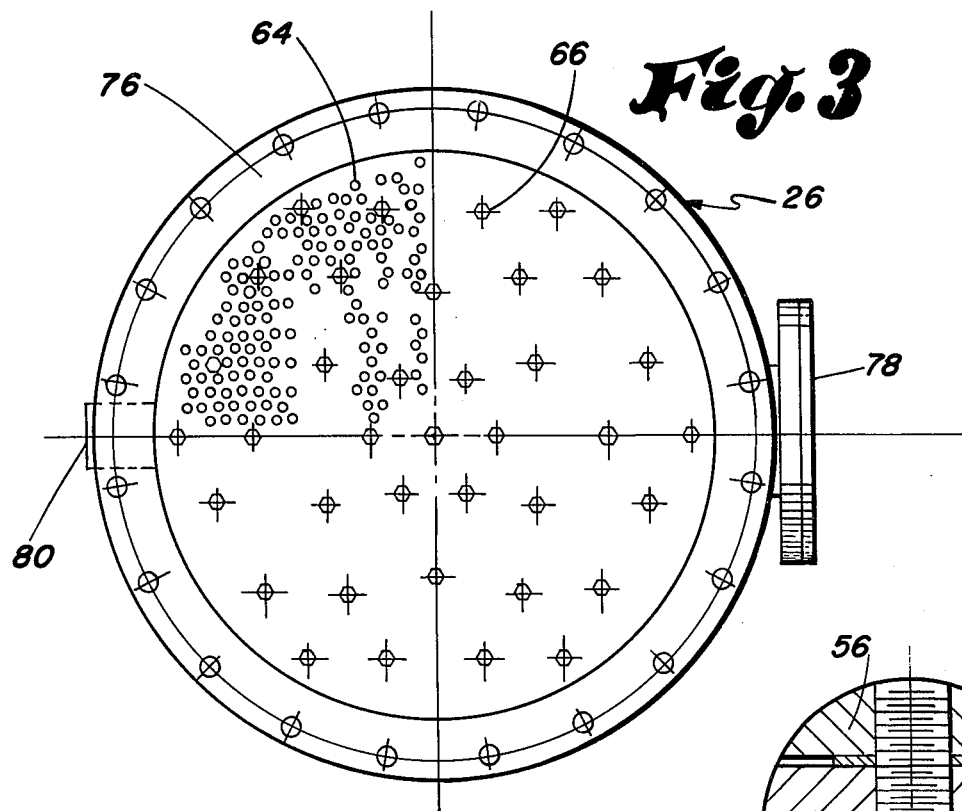
FIG. 3 is a bottom plan view corresponding to FIG. 2.
Figure 4:
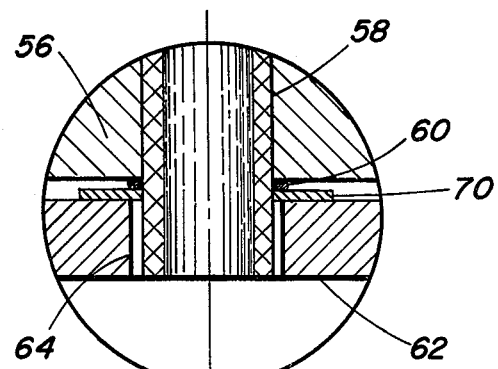
FIG. 4 is an enlarged sectional detail taken at the 4—4 circle in FIG. 2.

The module housing 54 is also fitted at each end with assembly flanges 76 by which modules 26 are installed in a hyperfiltration loop 24 such as is diagramed in FIG. 1, and has lateral access ports 78 as well as laterally opening pipe couplings 80 adjacent each end (see FIG. 2). The access ports 78 permit installation and maintenance access to the hyperfiltration tubes 52, while the pipe couplings 80 provide respectively for withdrawal of effluent permeate and venting of module 26 depending on the vertical orientation with respect to the direction of recirculating flow in loop 24. That is, the upper pipe coupling 80 in FIG. 2 would be used for venting the right loop leg in FIG. 1 and as a permeate outlet in the left leg.

The present invention has been described in detail above for purposes of illustration only and is not intended to be limited by this description or otherwise to exclude any variation or equivalent arrangement that would be apparent from, or reasonably suggested by, the foregoing disclosure to the skill of the art.

We claim:

1. A hyperfiltration module having a bundle of elongate, porous tubes lined with semipermeable membranes and fixed in sealed relation within a chamber so that liquid to be filtered is directed in parallel therethrough, and wherein an improved arrangement is provided for effecting said sealed relation of said tube ends within said chamber comprising flat closure members fixed adjacent each end of said chamber and having a pattern of apertures formed therein for respective slip fit disposition of end portions of each tube of said bundle therethrough, a resilient O-ring sealing member disposed around each tube end portion at the outer face of each of said closure members, and a face flange at each closure member having a corresponding pattern of apertures formed therein for receiving said tube end portions, said face flanges being bolted at the outer face of each closure member over said O-ring members with spacer elements interposed between said face flanges and closure members at a thickness proportioned to limit compression of said O-ring members by said bolted face flanges against destructive stressing of said tube end portions while allowing enough compression of said O-ring members for effective external sealing of said tube end portions at said closure members.

2. A hyperfiltration module including the improved sealing arrangement defined by claim 1 and wherein the apertures formed in said face flanges are enlarged in relation to those in said closure members for facilitating reception of said tube end portions in said face flange apertures, and a washer is additionally disposed around each tube end portion over said O-ring sealing members for compressing the same when the face flanges are bolted in place.

3. A hyperfiltration module including the improved sealing arrangement defined by claim 1 and wherein the face flange bolted to the closure member at the outlet end of said module is combined with means to maintain said tubes in place against endwise thrust in the outlet direction.

4. A hyperfiltration module including the improved sealing arrangement defined by claim 3 and wherein an end plate is additionally bolted along with said face flange to the closure member at the outlet end of said module, said end plate having a corresponding pattern of apertures formed therein that are of sufficiently smaller diameter than that of said tubes to maintain the tubes in place against endwise thrust in the outlet direction.

* * * * *